Dec. 27, 1949     A. W. OEHLER ET AL     2,492,881
HARVESTER REEL
Original Filed June 22, 1944     2 Sheets-Sheet 1
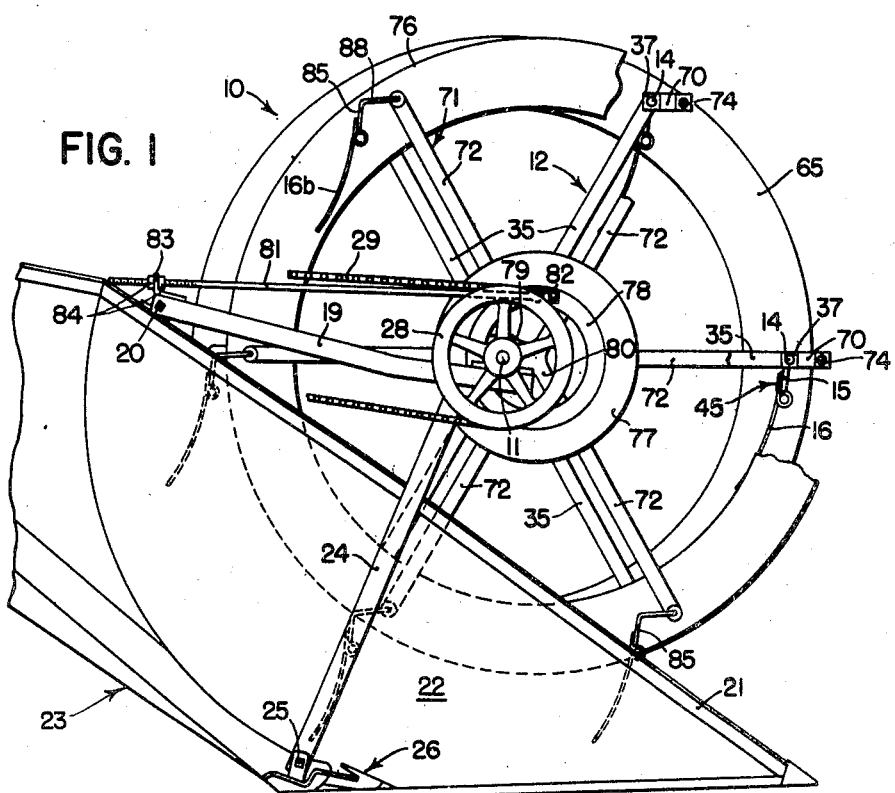
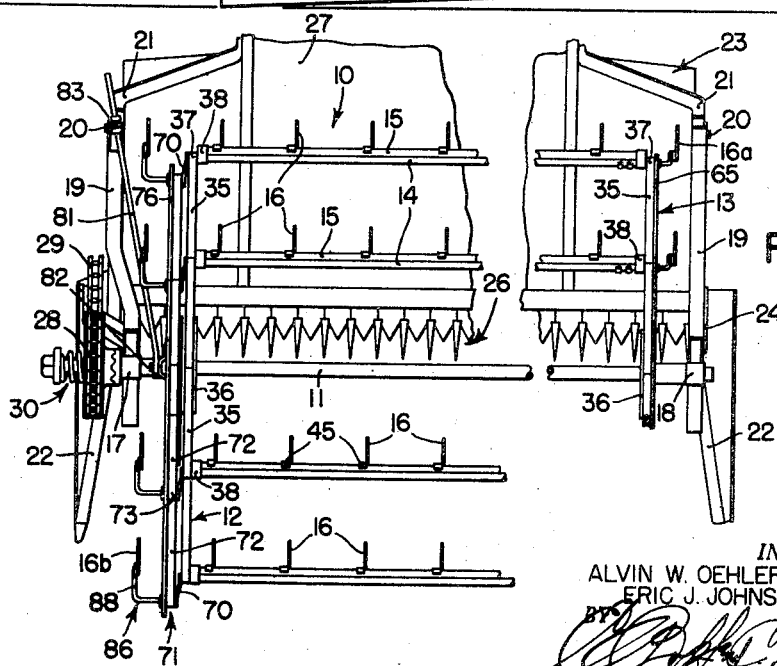
INVENTORS
ALVIN W. OEHLER &
ERIC J. JOHNSON
ATTORNEYS Dec. 27, 1949     A. W. OEHLER ET AL     2,492,881
HARVESTER REEL
Original Filed June 22, 1944     2 Sheets-Sheet 2
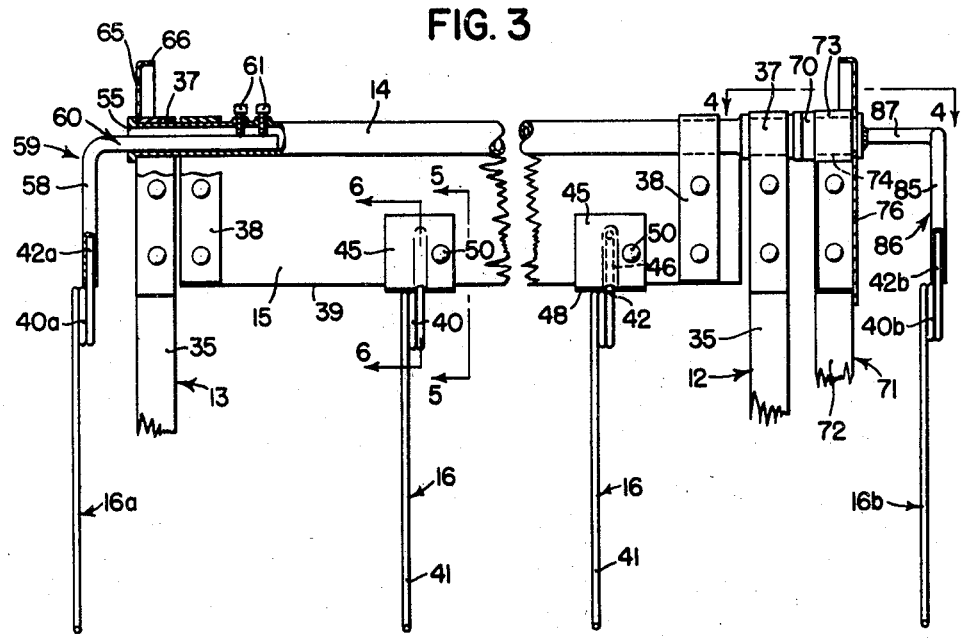
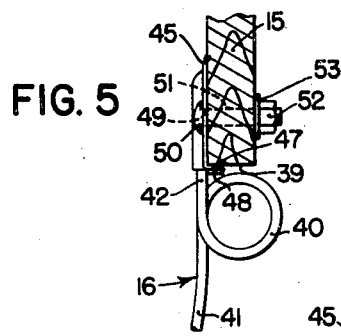
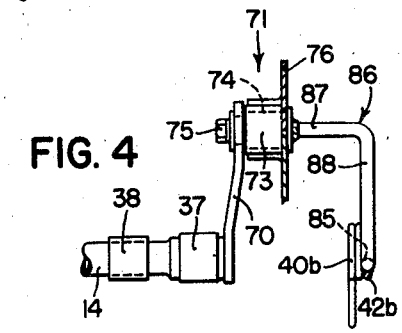
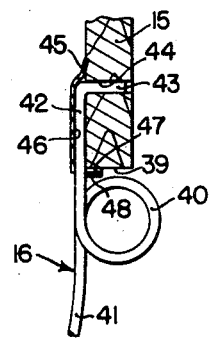
*INVENTORS*
ALVIN W. OEHLER &
ERIC J. JOHNSON
BY
ATTORNEYS Patented Dec. 27, 1949

2,492,881

UNITED STATES PATENT OFFICE 2,492,881

HARVESTER REEL

Alvin W. Oehler and Eric J. Johnson, Moline, Ill., assignors to Deere & Company, Moline, Ill., a corporation of Illinois Original application June 22, 1944, Serial No. 541,573. Divided and this application January 19, 1946, Serial No. 642,346

6 Claims. (Cl. 56—221)

The present invention relates generally to harvester reels and more particularly to reels having crop engaging members which maintain a predetermined angular relation to the ground as they move into engagement with the crops, sometimes called "feathering" reels. The principal object of the invention relates to the provision of a novel and improved means for mounting the fingers on the reel bats, and that is simpler and cheaper to manufacture without sacrifice in durability. A related object has to do with the provision of a novel mounting clip for mounting spring fingers on wood bats and supporting the fingers in such a manner as to restrict excessive vibration of the latter. This application is a division of our co-pending application Serial No. 541,573, filed June 22, 1944, now Patent Number 2,406,706.

These and other objects and advantages of my invention will be apparent to those skilled in the art after a consideration of the following description in which reference is had to the drawings appended hereto, in which Figure 1 is a side elevation of a harvester platform and reel, a portion of the latter being broken away to show details of construction;

Figure 2 is a plan view, also broken away in parts;

Figure 3 is an enlarged front elevation of the end portions of one of the reel bats showing the mounting means and extra fingers, the middle of the bat being broken away;

Figure 4 is a fragmentary plan view taken along a line 4—4 in Figure 3;

Figure 5 is an enlarged side elevation showing one of the finger mounting devices, taken along a line 5—5 in Figure 3; and Figure 6 is an enlarged sectional elevational view taken along a line 6—6 in Figure 3.

Referring now to the drawings, the harvester reel is indicated in its entirety by reference numeral 10 and includes generally a main supporting axle or shaft 11, on which is rigidly mounted a pair of laterally spaced spiders 12, 13 carrying a plurality of bat supporting shafts 14, on each of which is mounted a wooden bat 15 and a row of crop engageable fingers 16 fixed to the edge of each bat. The axle 11 is journaled in a pair of bearings 17, 18, mounted on a pair of fore and aft extending supporting arms 19, which are secured at their rear ends by bolts 20 to the top members 21 of the side walls 22 of a harvester platform, indicated by reference numeral 23. The forward ends of the supporting arms 19 are carried on legs 24 secured by bolts 25 to the platform. A cutter bar 26 extends transversely across the platform 23 beneath the reel 10 and severs the crops from the field while the reel 10 rotates in a clockwise direction as viewed in Figure 1 to lay the harvested crops rearwardly upon the platform conveyor 27 in well-known manner. The reel axle 11 is driven by a sprocket 28 over which a drive chain 29 is trained to transmit power from any suitable source (not shown). The sprocket 28 is journaled on the axle 11 and is connected therewith through a slip clutch 30 of conventional design.

Each of the spiders 12, 13 comprises a plurality of spokes 35, fixedly secured to the axle 11 by suitable mounting plates 36 and extending generally radially therefrom. The bat supporting shafts 14 are each journaled at opposite ends, respectively, in a pair of bearings 37 mounted on corresponding spokes 35 of the spiders 12, 13. Each shaft 14 carries a bat 15, which is rigidly fixed along one edge to the shaft by securing straps 38.

A row of crop engageable spring fingers 16 is secured to the opposite edge 39 of each bat. Each finger 16 comprises a helical coil 40 formed of two turns of spring wire, a tine 41 extending tangentially from one end of the coil 40, and a supporting shank 42 extending in the opposite direction from the other end of the coil 40. The end 43 of the shank 42 is bent at right angles to the shank and is received within a hole 44 in the bat 15. The shank 42 extends over the edge 39 of the bat and lies against the side of the bat with the coil 40 disposed adjacent the edge 39 of the bat and the tine 41 extending outwardly therefrom, all of the tines in the row lying in transverse alignment.

A securing clip 45 lies over each supporting shank 42 and comprises a small plate preferably formed of sheet metal with the center portion pressed or otherwise deformed to form a groove 46 on the inner side of the plate to receive the shank 42, the surrounding portions of the plate being flat against the bat. The lower edge of the plate 45 is turned under the edge 39 of the bat to form a flange 47, which is slotted to straddle the shank 42. A reenforcing strip 48, also preferably of sheet metal, lies along the lower surface of the flange 46 and is rigidly fixed thereto, as by welding. The reenforcing strip 48 passes under the shank 42 and serves as a support or brace for the latter.

The clip 45 is perforated at 49 to receive a fastening bolt 50, which is inserted through an aligned aperture 51 in the bat 15 offset from the hole 44, and the bolt is secured by a nut 52, threaded on the end of the bolt on the opposite side of the bat 15, over a washer 53.

As the reel rotates in a clockwise direction during operation, as viewed in Figure 1, the forces affecting the fingers due to engagement with crop material tend to force the shank 42 against the reenforcing strip 48 and against the surface of the groove 46. Thus, the strip 48 provides a durable fulcrum for the finger. Without the strip 48 the shank would press or wear a notch in the edge of the bat. The groove 46 also prevents lateral displacement of the finger, while the turned end 43 prevents the finger from shifting longitudinally of the groove. The entire finger and clip assembly can easily be removed by removing one bolt 50.

Each shaft 14 comprises a hollow tube, one end 55 of which is open beyond the spider bearing 37. Due to variations in the widths of harvester platforms and to the inaccuracies in mounting the supporting arms 19, 20, there is sometimes an appreciable space between the end of the reel and the platform wall 22 in which the crops are not subject to positive action by the reel. This condition is remedied by providing an extra finger 16a outwardly of the spider 13, for the purpose of positively engaging and moving any crops in this space. The finger 16a is rigidly fixed to one arm 58 of an L-shaped member 59, preferably by welding the shank 42a thereto. The other arm 60 of the member 59 extends axially in telescoping relation to the shaft 14 and serves as an extension of the latter beyond the spider 13. The member can be adjusted axially of the shaft 14 to obtain the desired clearance between the the finger 16a and the side wall 22 of the platform by shifting the arm 60 in or out of the end 55 of the shaft 14, and can also be rotated to swing the finger 16a into any desired angular relation with the row of fingers 16 on the bat 15. Preferably, the finger 16a is adjusted to a position in transverse alignment with the others in the row. The finger 16a is fixed to the shaft 14 in laterally and angularly adjusted position by tightening a pair of set screws 61, which are mounted in suitable threaded apertures in the shaft 14. Thus, the arms 58 lie in the planes of the associated bats 15 and swing therewith relative to the spider 13.

The outer ends of the spokes 35 in the spider 13 are interconnected by an annular shield 65, preferably formed of sheet metal with an inwardly turned stiffening flange 66. The shield braces the arms 35 and prevents crops from catching on the ends thereof.

On the opposite end of each shaft 14 is fixed an actuating arm 70 outwardly of the spider 12, and disposed at an angle to the plane of the bat 15. A control spider 71 is disposed laterally outwardly of the spider 12 and comprises a plurality of spokes 72, the outer ends of which carry journal sleeves 73, which embrace bearings 74 rigidly fixed by bolts 75 to the outer ends of the arms 70, respectively. The spokes 72 are interconnected at their outer ends by an annular shield 76 and the inner ends are interconnected by an annular member 77. The inner ends of the spokes 72 bear on the outer surface of a camming cylinder 78, which is mounted on a hub 79 journaled on the reel axle 11. The hub 79 is fixed eccentrically of the camming cylinder 78 and is braced by spokes 80. The cylinder 78 is normally held stationary by a brace rod 81, bolted at 82 to the cylinder 78 and extending rearwardly through an apertured bracket 83 fixed to the supporting arm 19. The rod 81 is threaded to receive a pair of adjusting nuts 84 on opposite sides of the bracket 83 to adjust the rod fore and aft to swing the cylinder 78 about its eccentric axis, thereby shifting the axis of the control spider 71 relative to the axis of the axle 11. This causes the arms 70 to shift angularly relative to the spider 12, thereby rocking the shafts 14 and bats 15 to adjust the fingers 16 to various angles of approach to the harvested crops, as is well-known to those skilled in the art.

Heretofore, the crops in the space occupied by the spiders 12 and 71, between the end fingers 16 on the bats and the side wall 22 of the platform 23 have received no positive action by the reel. According to the present invention, however, this portion of the crop is acted upon by a plurality of extra fingers 16b disposed between the control spider 71 and the adjacent side wall 22. Each finger shank 42b is welded to one end 85 of an arm 86 which has a supporting end 87 fixed to the end of the bearing 74 and extending axially outwardly therefrom. The arm 86 is bent to form a radially extending portion 88 lying substantially in the plane of the control arm 70, and the end 85 is carried at the outer end of the portion 88 and lies substantially in the plane of the associated bat 15. Thus, since the arm 86 is rigid with the bearing 74, arm 70, shaft 14, and bat 15, the finger 16b is carried in transverse alignment with the row of fingers 16 on the bat and swings angularly therewith. Inasmuch as the arms 86 are solely supported on the ends of the bearings 74, there is, of course, no interference between the fingers 16b and the feathering mechanism during operation.

We claim:

1. In harvesting apparatus, the combination of a reel bat having a hole therein, a crop engageable finger lying across one edge of said bat and having one end turned into said hole, a securing clip comprising a plate lying over said finger and including a flange portion slotted to receive said finger and turned under the edge of said bat, a member fixed to said flange portion and extending across the slot under said finger to support the latter, and means securing said clip to said bat.

2. In harvesting apparatus, the combination of a reel bat having a hole therein, a crop engageable finger lying across one edge of said bat and having one end turned into said hole, a securing clip comprising a plate lying over said finger and including a flange portion turned under the edge of said bat and a central portion defining a groove in the inner surface of the plate to receive said finger to prevent lateral displacement thereof, said flange portion being slotted to receive the finger, a member fixed to said flange portion and extending across the slot under said finger to support the latter, and means for securing said clip to said bat.

3. In harvesting apparatus, the combination of a reel bat having a hole therein, a crop engageable finger lying across one edge of said bat and having one end turned into said hole, a securing clip comprising a plate lying over said finger and including a flange portion turned under the edge of said bat and a central portion defining a groove in the inner surface of the plate to receive said finger to prevent lateral displacement thereof, said flange portion being slotted to receive the finger, a member fixed to said flange portion and extending across the slot under said finger to support the latter, said bat and said plate having aligned apertures spaced from said hole, and a fastening member extending through said aligned apertures.

4. In harvesting apparatus, the combination of a real bat, a crop engageable finger lying across one edge of said bat and a securing clip comprising a plate lying over said finger and including a flange portion turned under the edge of said bat and a central portion defining a groove in the inner surface of the plate to receive said finger to prevent lateral displacement thereof, said flange portion being slotted to receive the finger, a member fixed to said flange portion and extending across the slot under said finger to support the latter, means for connecting said finger to the clip against movement in at least one direction longitudinally of said groove, and means for securing said clip to said bat.

5. In harvesting apparatus, the combination of a real bat, a crop engageable finger lying across one edge of said bat and a securing clip comprising a plate lying over said finger and including a flange portion turned under the edge of said bat and a central portion defining a groove in the inner surface of the plate to receive said finger to prevent lateral displacement thereof, said flange portion being slotted to receive the finger, a member fixed to said flange portion and extending across the slot under said finger to support the latter, means for connecting said finger to the clip against movement in at least one direction longitudinally of said groove, said bat and said plate having aligned apertures spaced from said hole, and a fastening member extending through said aligned apertures.

6. In harvesting apparatus having a reel bat and a crop-engaging finger including one end proximate to the bat and a remote end extending across one edge of and away from the bat: a securing clip for carrying the finger on the bat comprising a plate-like element having an inner surface provided to rest against the bat and overlie the finger and being formed with a groove to receive the finger, said groove being open at one end so that the remote end of the finger may extend away from the bat and clip and having means fixed across its other end portion to provide an abutment engageable by the bat end of the finger to preclude shifting of the finger lengthwise of the groove in the direction toward the bat, means on the clip including a flange portion bent at an angle to the inner surface of the clip to engage under the edge of the bat, and means on said flange portion providing an aperture aligned with the open end of the groove and through which the finger extends.

ALVIN W. OEHLER.
ERIC J. JOHNSON.

REFERENCES CITED

The following references are of record in the file of this patent:

UNITED STATES PATENTS

| Number | Name | Date |
| --- | --- | --- |
| 155,505 | Edgar | Sept. 29, 1874 |
| 217,455 | Fager | July 15, 1879 |
| 882,376 | Eichelberger | Mar. 17, 1908 |
| 1,441,787 | Davis | Jan. 9, 1923 |